Nov. 22, 1932.  L. GRAUMAN  1,888,798
BEVERAGE MIXER SUPPORT
Filed March 17, 1928
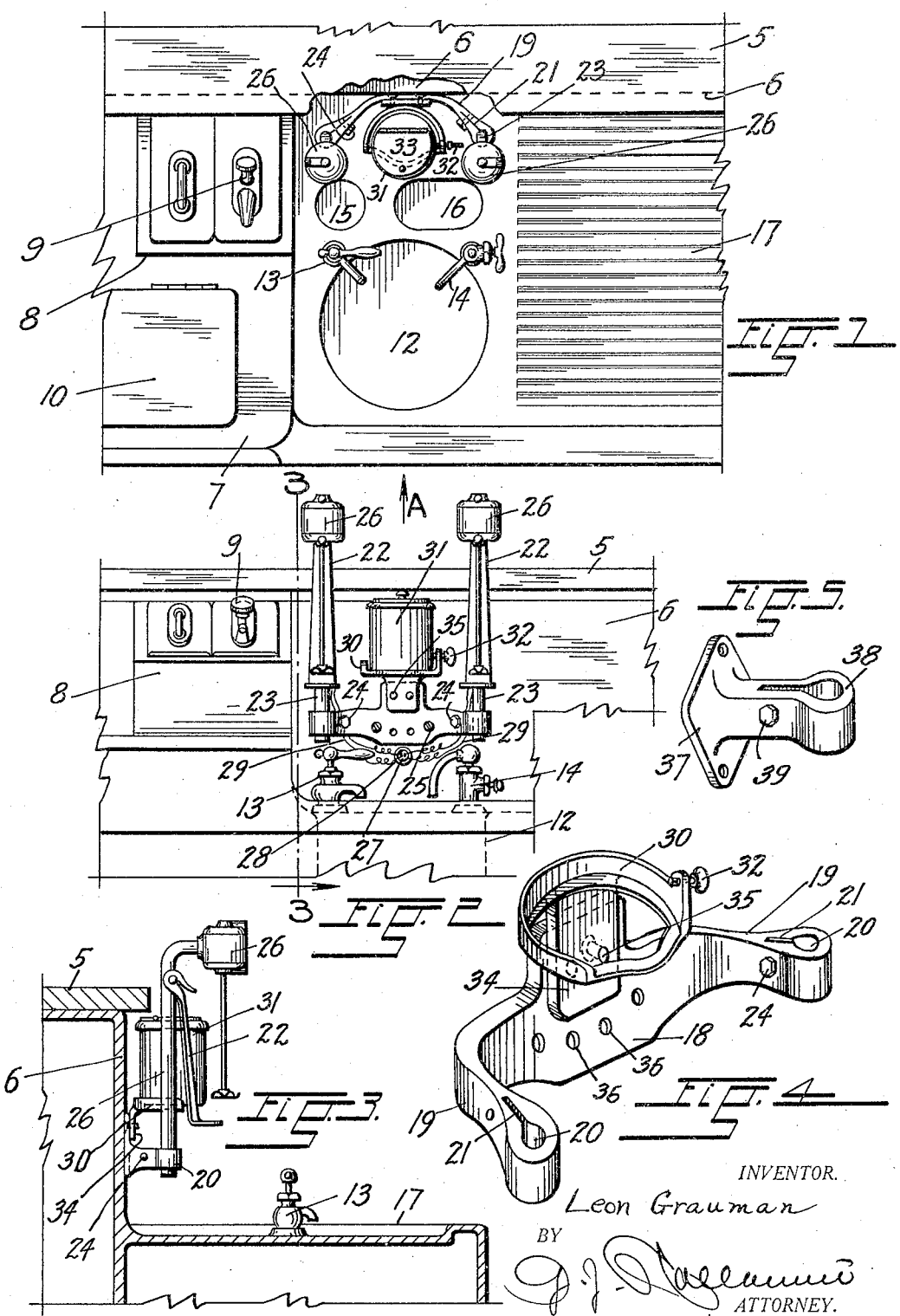
INVENTOR.
Leon Grauman
BY
ATTORNEY.

Patented Nov. 22, 1932

1,888,798

UNITED STATES PATENT OFFICE

LEON GRAUMAN, OF DENVER, COLORADO

BEVERAGE MIXER SUPPORT

Application filed March 17, 1928. Serial No. 262,467.

This invention relates to improvements in soda fountains and its principal object is to provide in a soda fountain structure, a support for one or more beverage mixers in fixed relation to other elements and parts of the structure that are utilized in the preparation of drinks by means of the mixers.

A further object is to provide in association with the same support, means for holding one of the ingredients of mixed drinks in readily accessible vicinity to the mixer or mixers and other objects reside in details of construction of the support and in its arrangement relative to a fixed electric connecting member and to other parts of the fountain structure, all of which will be clearly brought out in the course of the following description.

In the accompanying drawing in which like parts in the views are similarly designated, Figure 1 represents a fragmentary plan view of a portion of a soda fountain to which the improvements comprised in the invention are applied.

Figure 2, a front elevation of the construction illustrated in Figure 1, looking in the direction of the arrow A, Figure 3, a vertical section taken on the line 3—3, Figure 2, Figure 4, a perspective view of the support, drawn to a larger scale, and Figure 5, a perspective view of a modification of the support.

The soda fountain structure as shown in the drawing, comprises a counter 5, a splash back 6 and a work board 7. On the splash back are located a milk container 8 and a milk pump 9 comprised in a unit which is the subject of an application for patent, Serial No. 262,466 filed Mar. 17, 1928 simultaneously with the present application Patent No. 1,770,611, of July 15, 1930.

On the work board of the fountain are found, a normally lid-covered storage bin 10 for bottled milk, a sink basin 12, hot and cold water faucets 13 and 14, a sunken pit 16 for an ice cream dipper or other tool used in the preparation of beverages, a chute 15 for the discharge of waste and refuse matter and a drain board 17.

The sink, the faucets, the container and the waste chute are assembled on a portion of the work board immediately adjoining the milk bin and the milk pump, and on the splash back of the structure above said portion of the work board is the fixture comprised in the invention. The fixture in its preferred form consists of a bracket 18 provided with two forwardly projecting arms 19, the ends of which are apertured as at 20 and partially split as at 21, for the support of beverage mixers 22 of conventional construction.

The mixers are usually mounted on holders provided with stems 23 and these stems are inserted in the apertures of the arms and clamped in place by means of headed screws 24 in threaded openings of the arms, crosswise of the split portions of the same.

The brackets are secured upon the splash back of the fountain by machine screws 25.

The mixing devices shown in the drawing are operated by electric motors 26 forming a permanent part thereof and in order to connect these motors in an electric circuit the splash back has below the bracket a socket 27 for the insertion of a plug 28 connected with the motors by means of wires 29. Projecting forwardly from the bracket intermediate of its arms, is an annular circumferentially flanged holder 30 for a jar 31 containing an ingredient of mixed drinks. The jar is clamped upon the holder by a set screw 32 extending through an aperture in the flange thereof, and it is usually provided with a hinged lid 33.

The annular support 30 is fastened to the bracket by means of a preferably integral, downwardly projecting foot 34 and machine bolts 35 extending through countersunk apertures 36 of the bracket into screw-threaded holes of the foot.

It is preferred to provide the bracket with two or more pairs of apertures 36 at different elevations so that the position of the jar support may be changed to accommodate jars of different proportions beneath the level of the counter structure.

On soda fountains of small dimensions a single bracket of the construction illustrated in Figure 5 of the drawing may be used. These brackets may be provided in any number, they are like the bracket hereinbefore described, adapted to receive the stems of mixing devices of standard construction, which are clamped in place by screws and they are fastened upon the splash back of the fountain in convenient vicinity of the milk pump, milk bin and wash basin, as is the double bracket shown in the drawing.

The bracket shown in Figure 5 comprises a plate 37, a forwardly projecting apertured and slit arm 38, integral therewith and a screw 39 for securing a mixer on the arm.

It is to be understood that the mixers may be attached to the brackets by means other than those shown and hereinbefore described.

In using my invention, the mixing devices are mounted in a fixed position relative to the other parts of the fountain structure, readily accessible to the operator and independent of any other stand or support.

The mixer thus disposed, becomes a permanent part of the fountain structure and is not in the way or inconveniently situated like the movably supported mixers at present in common use, which are placed on the counter in front of the customers or otherwise on a shelf or counter behind the operator which requires the operator to turn around each time as a drink is mixed.

The jar 31 on the bracket contains an ingredient most commonly used in the preparation of mixed drinks. At the present time, malted milk is a popular beverage and the jar may be supplied with the malted milk powder. In preparing a drink, the operator supplies a mixing vessel with a quantity of the malted milk powder from the jar 31 and with milk pumped from the container 8 which previously has been filled from bottles stored in the bin 10. Ice cream may be added by means of a dipper which when not in use is kept in water in the sunken pit 16.

The vessel is placed on the mixer and the motor of the latter is actuated either by inserting the plug in the socket or by manipulation of a switch after the plug is in place.

After the beverage has thus been prepared and it has been poured from the vessel in which it was mixed, into a glass, the mixing vessel is washed in the basin 12 and placed to dry on the drain board 17. The glass of the customer is similarly cleansed after the dregs have been emptied into the waste chute 15 and it will be apparent that the convenient arrangement of the mixers and the washing facilities not only saves time, but is of great advantage from a sanitary viewpoint since it encourages immediate cleansing of the used utensils which under different conditions are frequently left and accumulate to be washed at a later time or to be used again and again without being washed.

What I claim and desire to secure by Letters Patent is:

A device of the character described comprising a bracket having means for fastening it to an upright surface, two forwardly projecting arms on the bracket, each having at its end means to operatively support a self-contained beverage mixer in an elevated position, and a seat on the bracket between and rearward of the arms for the support of a container.

In testimony whereof I have affixed my signature.

LEON GRAUMAN.